Figure 1:
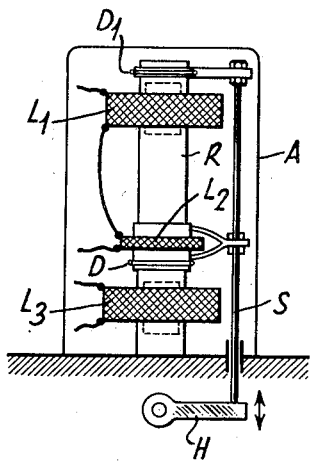

Jan. 16, 1940. K. WILHELM ET AL 2,187,340

MEANS ADAPTED TO REGULATE THE BAND WIDTH

Filed July 27, 1938

INVENTORS
KARL WILHELM
ERNST KETTEL
BY
H. S. Grover
ATTORNEY

Patented Jan. 16, 1940

2,187,340

UNITED STATES PATENT OFFICE 2,187,340

MEANS ADAPTED TO REGULATE THE BAND WIDTH

Karl Wilhelm and Ernst Kettel, Berlin, Germany, assignors to Telefunken Gesellschaft für Drahtlose Telegraphie m. b. H., Berlin, Germany, a corporation of Germany Application July 27, 1938, Serial No. 221,504
In Germany July 24, 1937

5 Claims. (Cl. 178—44)

There has been disclosed in the application Serial No. 175,593 filed November 20, 1937 in the name of J. Winkler an arrangement adapted to insure a steady regulation of the band width of a band-pass filter comprising two coupled oscillation circuits which distinguishes itself particularly by great simplicity combined with practical freedom from detuning. For it will be noted that only a small coupling coil being in series with the main coil of one of the oscillatory circuits is shifted in relation to the coil of the other oscillation circuit in the axial direction which is common to all coils.

Now, the problem was to alter the attenuation simultaneously with the coupling in order to obviate the crevass which arises when the coupling is stronger. It is known in the earlier art, to the said end, to so couple mechanically the circuit elements which serve to change the coupling conditions with the circuit elements which are used for altering the attenuation or damping that adjustment of both means may be made feasible by the operation of one and the same knob. However, it is desirable in this connection to dispense with coupling rods. The ways and means of accomplishing this for a band-pass filter in which one of the coils is turned or pivoted in reference to the other coil has been basically disclosed in the German Patent No. 647,373 granted to applicants. The disclosure of the said patent consists in fixedly mounting a damping turn or damping winding in such a manner that the coupling of such rotatable or pivotal coil with the said turn becomes closer or stronger as the coupling with the other coil is relaxed (reduced). But this arrangement is unsuited in connection with the band-pass filter disclosed in the above copending application for the reason that the change in coupling conditions is accomplished by the shifting of a coil rather than by a turning movement.

An arrangement according to the invention designed for regulating the band width by shifting a small coupling coil connected in series relation to the main coil of one of the oscillatory circuits in reference to the coil of the other oscillatory circuit as disclosed in the above application is so constructed that a damping turn or winding is in fixed mechanical coupling relationship with the small coupling coil and is so mounted in the joint axial direction of all coils that, in the presence of closer coupling, it will cause a damping action in the oscillation circuit which does not have the small coupling coil included in said circuit.

As compared with the said arrangement comprising a revoluble oscillation circuit coil there is obtained this further advantage that the damping turn or loop may be mounted at very close proximity to the coil of the circuit which is to be damped, whereas if the coil were rotated, the diameter of the damping ring would have to be made larger than the maximum diameter of the coil in order that the coil may still be positioned obliquely inside the damping loop. By referring to the said earlier application it will be seen that because of the lower detuning it is more favorable to choose the effective or ohm resistance of the loop high.

Figure 2:
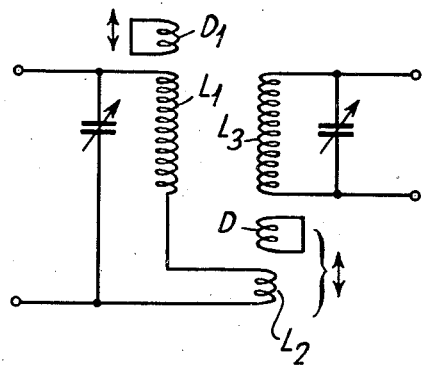

The invention shall now be described in more detail by reference to the appended drawing. Fig. 1 is a view of the arrangement while Fig. 2 shows a circuit organization thereof. In both figures, like coils have been denoted by identical reference letters. Referring to Fig. 1, it will be seen that in the shielding container or can is mounted a tubular piece R made of insulation material which serves as a support for the stator coils $L_1$ and $L_3$. The rectangular parts shown dotted indicate the iron-cores which, for the purpose of balancing or alinement, may be shifted by turning a screw-thread (through openings of the shield or can which are not shown). The coil $L_2$ is mounted on a small tubular piece of somewhat greater diameter; by the agency of the lever H and the rod S the same may be moved up and down.

Upon the support of the coil $L_2$ is mounted a damping ring or loop D according to the present invention. This damper ring, as will be understood, will exercise a damping effect upon the coil $L_3$ which will be so much stronger, the farther the coil $L_2$, and thus also the damping ring D, have been shifted downwardly. The diameter of the said damping ring D could also be chosen so large that it will engage over the coil $L_3$ and thus have nearly the same diameter as the coil $L_3$.

The said damping ring is also in coupling relationship with the coil $L_2$ and thereby with the upper oscillation circuit. However, because of the reduced number of turns of $L_2$ compared with that of $L_1$ this coupling will be so small that it will play no part at all.

Since a symmetric resonance curve is obtainable only by simultaneous damping of both oscillation circuits of the band-pass filter, it will be seen that in the exemplified embodiment here shown an additional damping ring $D_1$ is provided which is actuated by the aid of the same rod S. This is an important feature since both the coupling coil as well as the damping rings are moved in the same sense with an appreciable resultant simplification of construction.

What we claim is:

1. The combination with a pair of tuned circuits having main reactances coaxially disposed in fixed spaced relation, of means for varying the coefficient of coupling between said reactances, said means comprising an adjustable auxiliary inductance coaxially arranged between the main reactances, said auxiliary inductance being mounted on a support and disposed closer to one of the reactances than to the other and being serially connected to said other reactance, a short-circuited winding mounted on said support for the auxiliary winding, and means for adjusting the axial position of the auxiliary inductance and the short-circuited winding.

2. The combination with a pair of tuned circuits having main reactances coaxially disposed in fixed spaced relation, of means for varying the coefficient of coupling between said reactances, said means comprising an adjustable auxiliary inductance coaxially arranged between the main reactances, said auxiliary inductance being disposed closer to one of the reactances than to the other and being serially connected to said other reactance, a short-circuited winding in fixed mechanical coupling relation with the auxiliary inductance, a shielding can enclosing the reactances, the auxiliary inductance and the short-circuited winding, and means for adjusting the axial position of the latter inductance and winding from outside the shielding can.

3. The combination with a pair of tuned circuits having main reactances coaxially disposed in fixed spaced relation, of means for varying the coefficient of coupling between said reactances and the damping of said circuits, said means comprising an adjustable auxiliary inductance coaxially arranged between the main reactances and disposed closer to one of the reactances than to the other and serially connected to said other reactance, a short-circuited damping winding in coupled relation with each of the main reactances, and means for simultaneously adjusting the axial position of the auxiliary inductance and the short-circuited windings.

4. In combination, a pair of tuned circuits, the first having a main inductance and an auxiliary inductance and the second having a main inductance, said main inductances being coaxially disposed in fixed spaced relation, the auxiliary inductance being coaxially adjustable and in inductive coupling relation with the main inductance of the second circuit, a short-circuited winding in coupling relation with each main inductance and coaxially disposed with respect thereto, and means for simultaneously adjusting the coaxial position of the auxiliary winding and the short-circuited windings.

5. The combination with a pair of tuned circuits having a pair of main inductances coaxially disposed on a common support and in coupled relation, of a shield can enclosing said inductances, said shield having a disturbing effect on the tuning of said circuits with variation of the coupling by coaxial movement of the inductances, means for avoiding said disturbing effect with change of coupling comprising a small auxiliary coil adjustably mounted on said support and disposed between the main inductances which are maintained in fixed position, said auxiliary coil being in inductively coupled relation with one of the inductances and serially connected in circuit with the other of said inductances, means for varying the damping of said circuits with change of coupling, said damping varying means comprising a pair of short-circuited windings also coaxially arranged on the common support and each being in coupling relation with its respective main inductance, and means extending through the shield can and mechanically coupled to the auxiliary coil and to the damping varying means whereby the coupling between the circuits and their damping may be varied.

KARL WILHELM.
ERNST KETTEL.